United States Patent [19]
Kerrigan et al.

[11] Patent Number: 4,573,802
[45] Date of Patent: Mar. 4, 1986

[54] DEICING METHOD AND APPARATUS

[75] Inventors: Jerome J. Kerrigan, Northbrook; Gregory E. Domanowski, Oak Park, both of Ill.

[73] Assignee: F. J. Kerrigan Plumbing Co., Wilmette, Ill.

[21] Appl. No.: 552,831

[22] Filed: Nov. 17, 1983

[51] Int. Cl.⁴ .................. G05D 11/02; B01F 15/04
[52] U.S. Cl. .................. 366/152; 137/101.19; 366/160
[58] Field of Search .............. 244/134 C, 134 R; 137/101.19; 366/152, 151, 160, 161, 162

[56] References Cited

U.S. PATENT DOCUMENTS

| | | | |
|---|---|---|---|
| 2,832,528 | 4/1958 | Spears | 244/134 C |
| 3,612,075 | 10/1971 | Cook | 244/134 C |
| 4,032,090 | 6/1977 | Trump | 244/134 C |
| 4,131,250 | 12/1978 | Binckley | 244/134 C |
| 4,191,348 | 3/1980 | Holwerda | 244/134 C |
| 4,209,258 | 6/1980 | Oakes | 366/152 |
| 4,433,701 | 2/1984 | Cox | 137/101.19 |

Primary Examiner—Robert W. Jenkins
Attorney, Agent, or Firm—Ralph R. Rath; Robert E. Wagner

[57] ABSTRACT

A method and apparatus for deicing aircraft includes a monitoring system for monitoring water and deicing fluid flow and circuitry for setting a predetermined mixture and comparing the water and fluid flow to automatically shut down the system when either flow is outside the setting.

4 Claims, 3 Drawing Figures

DEICING METHOD AND APPARATUS

DESCRIPTION

1. Technical Field

The present invention relates generally to deicing of aircraft and, more particularly, to a method and apparatus for controlling the mixture of deicing fluid and water.

2. Background Prior Art

In normal climates during winter months, aircraft which are parked on the ground overnight or on the ground during severe winter weather frequently accumulate ice or snow on the airfoil surface. Such accumulation must be removed prior to takeoff to insure proper performance of the aircraft.

The most popular type of equipment that has been utilized for ice and snow removal is a self-contained vehicle, such as a truck, that either has a premixed mixture of water and deicing fluid, such as ethylene glycol or propylene glycol, which may be heated to a predetermined temperature. Other self-contained systems include a large truck that has a first tank which is filled with water and a second tank that is filled with glycol or other deicing fluid, and the unit includes a pump and valving mechanisms for selecting the proper mixture between the water and the glycol. Most deicing systems that are presently being utilized rely exclusively on manual settings for providing the proper mixture between the deicing fluid and the water. As a result, some major aircraft disasters have occurred as a result of the operator improperly setting the mixture. This results in the actual formation of ice on the aircraft wing prior to takeoff, which, of course, impairs the operation of the aircraft.

In view of the importance of deicing of aircraft, various systems have been proposed in recent years for deicing of aircraft, and examples of such systems are disclosed in U.S. Pat. Nos. 4,191,348 and 3,612,075.

While various types of systems have been proposed, the most common type of deicing system that is presently being utilized is still the self-contained vehicle having separate tanks and manually-operable valves for controlling the mixture of water with deicing fluid.

SUMMARY OF THE INVENTION

According to the present invention, an automated control system for controlling the mixture of deicing fluid with water has been developed which incorporates an internal control system which automatically shuts down fluid flow whenever the deicing fluid and water mixture is beyond preset limits.

The control system consists of a source of deicing fluid and a source of water with pumps leading from the respective sources to first and second conduits, which are joined to a discharge hose. The control system also includes an electrical control panel that incorporates circuitry for selecting the desired mixture of water and deicing fluid and monitors the flow rates of both fluids and interrupts the flow when the mixture of deicing fluid and water is outside of the selected limits. The control circuitry also incorporates interlock means for indicating a fault condition of the flow of either of the fluids or various parameters, and is designed to isolate the particular fault and insure that the fault is corrected prior to proceeding with operation of the system.

BRIEF DESCRIPTION OF SEVERAL VIEWS OF DRAWINGS

DETAILED DESCRIPTION

Figure 1:
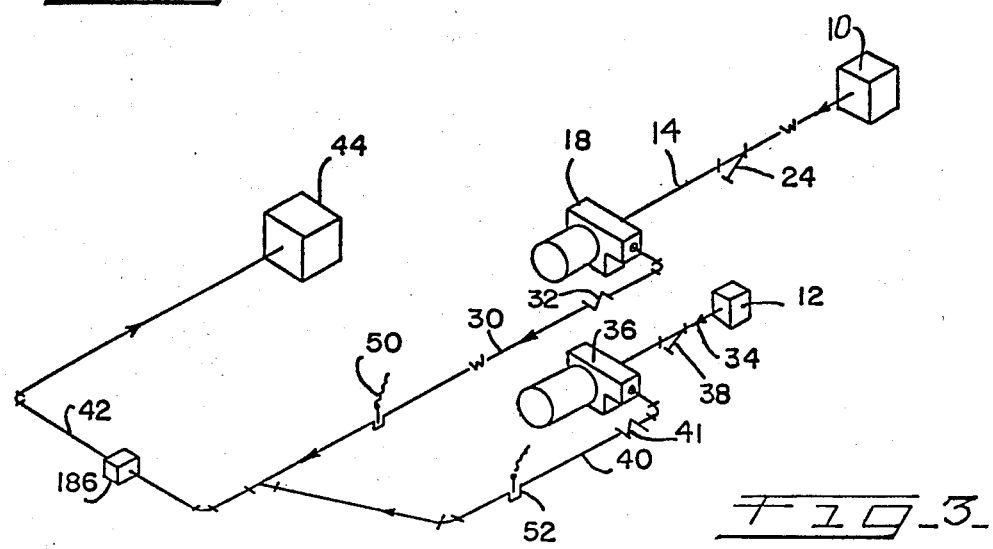
FIG. 1 is a schematic illustration of the hydraulic circuit of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses a deicing system for an aircraft including a source of water, generally designated by reference numeral 10, and a source of deicing fluid, generally designated by reference numeral 12, which may be glycol. A water conduit 14 leads from the water source to a pump 18. Conduit 14 incorporates a strainer or filter 24 for filtering out any contaminates in the water. The outlet of pump 18 is connected to a conduit 30 which has a check-valve 32 providing unidirectional flow from the pump into conduit 30.

A further conduit 34 leads from the deicing fluid source 12 to a second pump 36 with a strainer or filter 38 located in conduit 34. The outlet of pump 36 is connected to a conduit 40 having a check-valve 41 and both conduits 30 and 40 leading from the respective pumps 18 and 34 are connected to a common conduit 42 which leads to a storage tank 44 or other dispensing means depending on the type of deicing equipment available at the airport. Conduits 30 and 40 respectively have flow sensors 50 and 52 located therein. The flow sensors may be a commercial flow sensor, such as a Signet Model No. MK-515-PO.

Figure 3:
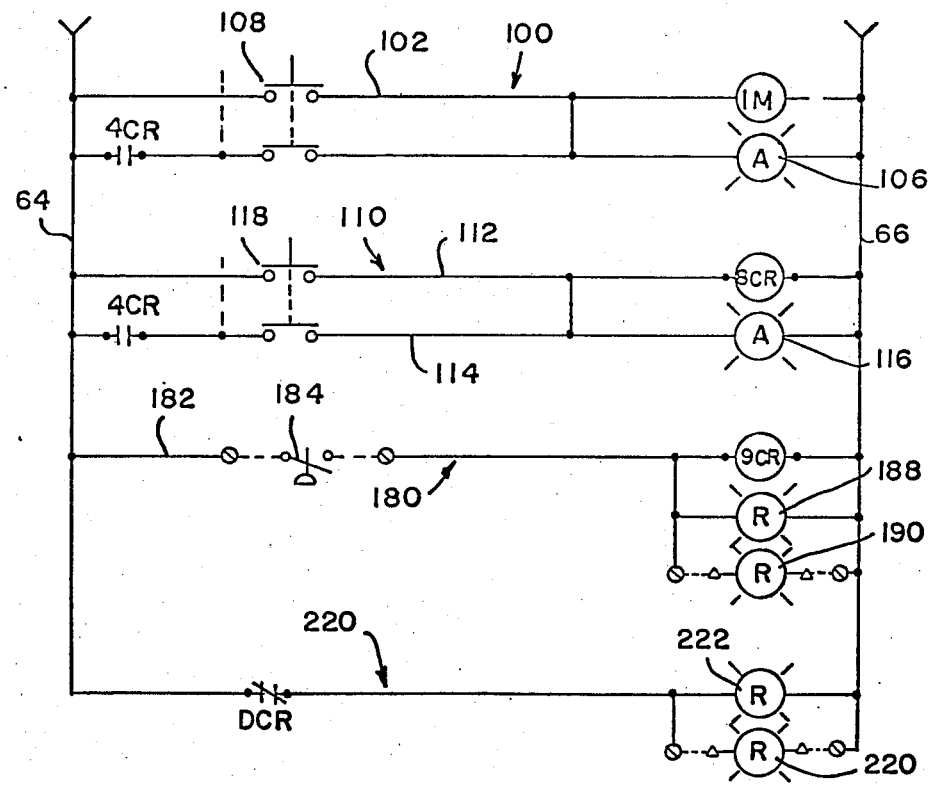
Figure 2:
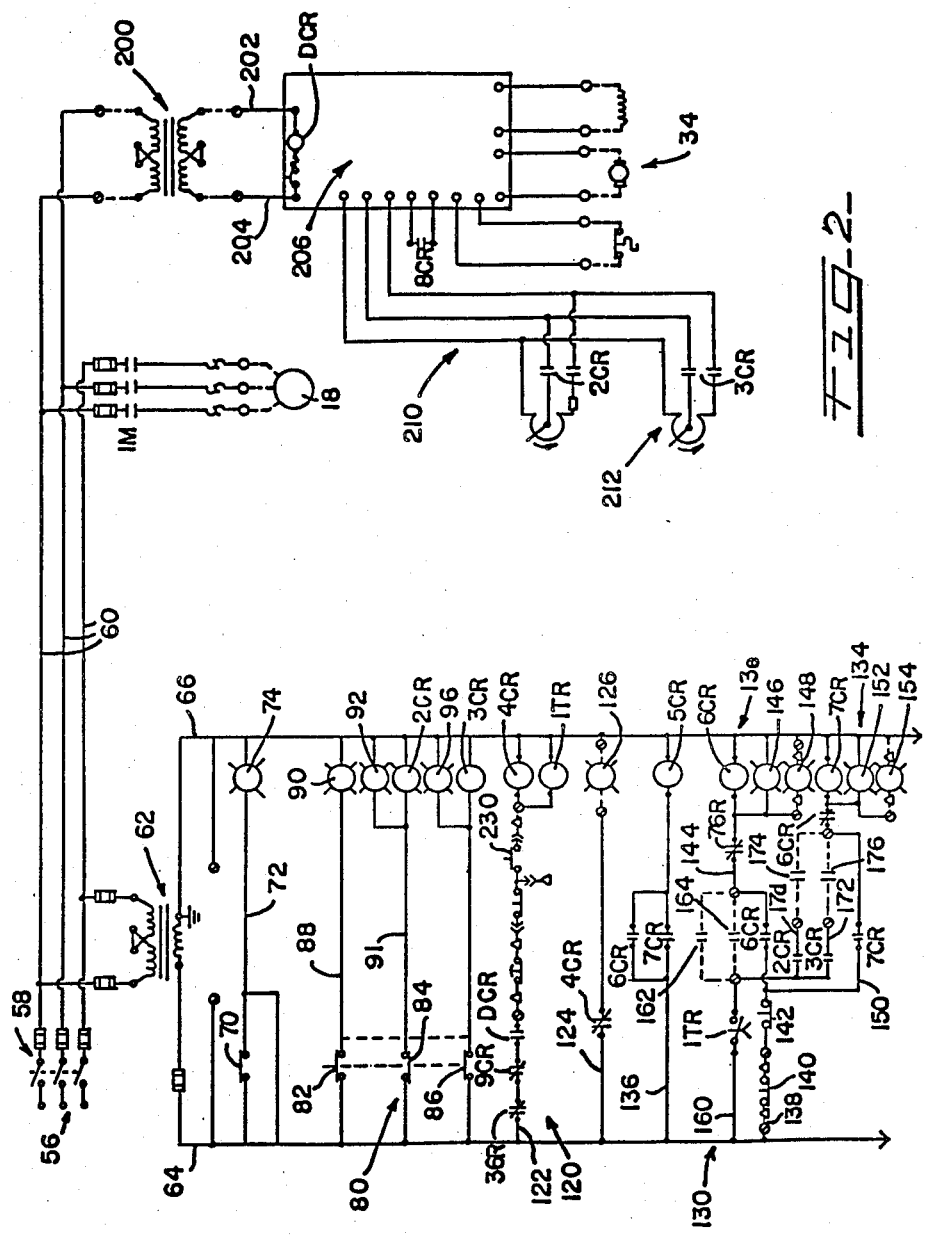
FIG. 2 is a partial schematic view of the electrical control system forming part of the deicing mechanism; and, FIG. 3 is a schematic view of the remainder of the electrical control system.

The electrical control system is illustrated in FIGS. 2 and 3 and is designed to be operated with water alone or preselected percentages of glycol, such as 30% or 50% mixture of glycol with the water. The control circuit includes a three-phase AC source 56 having a main switch 58 and lines 60. An AC/DC transformer 62 is connected to lines 60. The output of transformer 62 is connected to lines 64 and 66 to provide the power supply for the control circuitry, which will now be described.

A main power control switch 70 is located in line 64 while a line 72 is connected to line 66 which has an indicator light 74 therein. Thus, when the main power switch 70 is moved to the "on" position, light 74 is energized to indicate that the power to the system is "on".

The control system includes a three-position mixture selection switch 80 having a first set of contacts 82, a second set of contacts 84, and a third set of contacts 86. Contacts 82 are located in a line 88 having an indicator light 90 therein and when contacts 82 are closed, the system is set for applying water only through the system. Contacts 84 are located in a line 90 that has an indicator light 92 in parallel with control relay 2CR, while contacts 86 are in line 94 having an indicator light 96 in parallel with the control relay 3CR. In the specific embodiment illustrated, when contacts 82 are closed, water only is supplied through the system, while when contacts 84 are closed, a 30% mixture of glycol with the water is provided, and contacts 86 provide a 50% mixture of glycol with the water. It will be appreciated that these percentages can vary depending upon the environment and additional settings may be provided, if desired.

The water pump motor 18 is preferably a three-phase 480 volt 60 hertz fixed-capacity motor having a pumping capacity of approximately 100 gallons per minute. Motor 18 is operated by a control circuit 100 illustrated in the upper portion of FIG. 3 which includes a first line 102 having a motor relay 1M (FIG. 2) therein, which has normally open contacts 1M in the lines leading to the water pump motor 18. Water pump motor circuit 100 also has a second line 104 having an indicator light 106 and lines 102 and 104 also have a manual-override switch 108. Manual-override switch 108 is normally closed so that relay 1M will be energized when the main power switch 70 is turned "on".

Glycol pump 34 preferably has a variable speed DC motor associated therewith. The operation of the glycol pump motor 34 is controlled by glycol-control circuit 110, illustrated in FIG. 3. The glycol-control circuit 110 incorporates a first line 112 having a glycol-control relay 8CR therein and a parallel line 114 having an indicator light 116 with a manual-override switch 118 having contacts in both lines 112 and 114.

A main system control circuit 120 (FIG. 2) includes a first line 122 having a plurality of contacts therein, which will be described later, and a control relay 4CR in parallel with a time-delay relay 1TR. Control circuit 120 also includes a second line 124 having a pair of normally closed contacts 4CR and an indicator light 126. Thus, whenever the control relay 4CR is de-energized, contacts 4CR will close and indicator light 126 will turn "on" to indicate that the system has been shut down.

The main system control relay 4CR also has a pair of normally open contacts in water pump control circuit 100 (FIG. 3) and a pair of normally open contacts in the glycol pump control circuit 110.

The system incorporates a flow-fault circuitry, generally designated by reference numeral 130 on the lower portion of FIG. 2, which includes a water-fault circuit 132 and a gycol-fault circuit 134. The flow-fault circuit 130 incorporates a first line 136 having a control relay 5CR therein, along with two parallel sets of normally open contacts, which will be described later.

The flow-fault circuit also includes a main line 138 that has a pair of reset switches 140 and 142 therein. A water-fault line 144 leads from line 138 and has a water flow-fault control relay 6CR and a pair of indicator lights 146 and 148 in parallel with the relay. The glycol-flow fault circuit 134 consists of a line 150 leading from main line 138 with a glycol-flow fault control relay 7CR and a pair of indicator lights 152 and 154.

As indicated above, the system incorporates a interlocking means to isolate any given flow-fault and preclude any other flow-fault circuits from being energized after the first one has been energized. For this purpose, water-fault control relay 6CR has a set of normally open contacts 6CR in flow-fault line 136 and a pair of normally open contacts in water-fault line 144, as well as a pair of normally closed contacts 6CR in glycol-flow fault line 150. Likewise, glycol-flow fault control relay 7CR has a set of normally closed contacts in water-fault line 144, a set of normally open contacts 7CR in parallel with contacts 6CR in line 136 and a pair of normally open contacts in line 150.

The water and glycol flow-fault circuits also incorporate a second main line having a set of normally closed contacts 1TR associated with time-flow fault delay timer 1TR, for a purpose that will be described later. Line 160 is interconnected with line 144 through two parallel lines that respectively have normally open contacts 162 and 164 which are respectively closed when the flow is too low and when the flow is too high, as will be explained later.

Likewise, the line 160 is interconnected with line 150 through two parallel lines 170 and 172. Line 170 has a first set of normally open contacts 2CR and a second set of normally open contacts 174, while line 172 has a first set of normally open contacts 3CR and a second set of normally open contacts 176. The respective contacts 162, 164, 174 and 176 are closed by flow control devices that will be described later.

Before describing the operation of the interlock arrangement and the flow fault indicating mechanisms, the remainder of the circuitry will briefly be described. The control system also incorporates a high-pressure fault detection circuitry associated with the discharge conduit 42, illustrated in FIG. 1. The high-pressure circuit is designated as 180 in FIG. 3 and includes a line 182 having a set of normally open contacts 184 associated with a pressure switch 186 (FIG. 1) located in conduit 42. Line 182 also has a control relay 9CR in parallel with two indicator lights 188 and 190. The high-pressure relay 9CR has a set of normally closed contacts 9CR in main system line 122.

The DC control circuit for operating the variable horse-power DC motor for controlling the glycol-fluid flow is illustrated in FIG. 2 in the right-hand portion and consists of an AC-to-DC transformer 200 connected to lines 60. The output of the AC-to-DC tranformer is connected by lines 202 and 204 to a DC motor control circuit 206. A control relay DCR extends across lines 202 and 204 and has a first set of normally open contacts in the main system control circuit 122 so that the DC circuit must be energized before the system is operational. The control circuit 206 has two circuits 210 and 212 which, when energized, respectively will operate the glycol pump motor at 30% or 50% of a pre-set speed. Circuit 210 has normally open contacts 2CR and circuit 212 has normally open contacts 3CR.

The main DC circuit control relay DCR also has a set of normally closed contacts in glycol-powered drive line 220 which has two parallel indicator lights 222 and 224 therein. Also, the glycol run relay 8CR has a set of normally open contacts 8CR in the DC control circuit 206.

With the control circuit so far described, the main power switch 70 is closed after the power is supplied from the AC source 56 to provide power to the entire circuit. Initially, a setting is determined for fluid flow through the system by manipulation of the three-position switch 80.

Assuming that the switch is conditioned initially for water only, without any glycol mixture, contacts 82 are closed, which will energize indicator light 90 to indicate that "water only" has been selected for operation. Assuming that the DC power supply is operational, contacts DCR in main line circuit will be closed while in the normally closed contacts 5CR and 9CR remain closed since fault relay 5CR and the high-pressure relay 9CR are de-energized. When the system is ready for operation, a main switch 230 in line 122 is closed which will then energize main control relay 4CR. Closing of main control relay 4CR will open normally closed contacts 4CR in line 124 and will close normally open contacts 4CR in the water pump circuit 100 and in the glycol pump circuit 110. At the same time, flow-fault time delay relay ITR will momentarily open switch contacts ITR in the fault circuit line 160, which will preclude any fault from being indicated while the system is accelerating to the desired pumping speed. After the desired time delay, timer ITR times out and contacts ITR in line 160 close to condition the system for fault detection operation. During the selection of "water only" for the system, sensor 50 measures the water flow in line 30 and produces an output signal which is fed to a control panel that has a water flow indicator and a number of limit switches. The limit switches are preset to provide a flow of water within a predetermined range and, if the flow is outside the range, limit switches will actuate appropriate relays which will close either contacts 162 or 164 in the water flow-fault circuit 132. Assuming that the water flow is too low, contacts 162 will close to energize relay 6CR, which in turn closes contacts 6CR in line 136 to energize the fault relay 5CR. Energizing the flow-fault relay 5CR opens main line 122 and interrupts the power flow to the main control relay 4CR. Also, de-energizing control relay 4CR will de-energize both the water pump and the glycol-drive pump relays to shut down both motors. At the same time, energizing control relay 6CR opens contacts 6CR in the glycol fault circuit to prevent a possibility of having a glycol fault indicated at the same time. The control panel preferably also has indicator lights which indicate whether the flow in the fault condition was either too high or too low.

Assuming that the mixture selection is a 30% glycol mixture, contacts 84 would be closed, which would energize control relay 2CR, which in turn closes normally open contacts 2CR in the DC motor circuit 210 and also closes the contacts 2CR in the glycol fault circuit that are in series with the normally open contacts 174.

Of course, if the system is conditioned for 30% glycol mixture, such percentage requires a predetermined amount of glycol flow along with a predetermined amount of water flow. If the glycol flow is too low, sensor 52 activates a limit switch, which in turn closes contacts 174 to energize glycol-flow fault 7CR. This again closes contacts 6CR and the flow-fault line 136 to energize control relay 5CR. At the same time, normally closed contacts 7CR in line 144 open to prevent the water-flow fault circuit from being actuated. Also, normally open contacts 7CR are closed in line 150 to maintain glycol-flow fault control relay 7CR energized. The same condition occurs when a 50% glycol mixture selection is selected through closure of contacts 86.

The system will also shut down whenever the pressure in main line 42 is above a pre-set limit. If this occurs, contacts 184 in circuit 180 will close and energize relay 9CR and lights 188, which will open contacts 9CR in circuit 120 and deactivate the system.

It should be noted that there are two indicator lights in the water flow-fault, glycol-flow fault, DC fault and pressure circuits. The system is designed to have all of the circuits in a main electrical control panel which is divided into supervisory and maintenance sections with the main power ON/OFF switch and the water-only circuit in the supervisory section. The maintenance section includes all of the remaining circuitry. A secondary remote panel contains the parallel fault lights, system reset and emergency stop switches and is connected to the main panel by a cord.

The supervisory section is designed to have two locks so that both the operator and supervisor must be present to activate the system and the maintenance section by a single key carried by the operator.

The system is thus designed to monitor fluid flow to insure that there is a proper mixture of two or more fluids. While the monitoring system has been described with respect to a two-fluid mixture, additional fluids could be added with additional components.

We claim:

1. Control circuitry including interlocking means for indicating a fault condition of the flow of a specific fluid, and a fluidic system adapted to selectively provide a first-fluid-only flow and a first- and second-fluid mixture-flow at desired output ports, said control circuitry comprising in combination, a system flow fault relay, a first fluid fault relay and a second fluid flow fault relay, each of said relays including a coil and indicating means, movable contacts, the coil of said system low fault relay being connected to contacts of said other two relay coils to be energized when the coil of either of said other two contacts is energized in response to a respective fluid flow fault, and each of said other two relay coils being connected respectively to be de-energized when the second of said other relay coils is energized to thereby allow only one indicating means to be energized at a time.

2. Control circuitry including interlock means for indicating a fault condition of the flow of a specific fluid, and a fluidic system adapted to selectively provide a water-only flow and a water-and-deicing fluid mixture flow at desired output ports, said control circuitry comprising in combination, a flow fault relay, a water-flow fault relay and a deicing fluid-flow fault relay, each of said relays including coils and selectively operable and closeable contacts indicating means connected to be activated in response to energization of said coils, selected, normally open contacts of said water-flow fault relay and said deicing fluid-flow fault relay being connected in parallel with one another and in series with the coil of said flow fault relay, selected, normally closed contacts of said deicing fluid-flow fault relay contacted in series with the water-flow fault relay and selected, normally closed contacts of said water-flow fault relay connected in series with the deicing fluid-fault relay, whereby when a water-flow fault occurs, the water-flow fault relay coil is energized, thereby activating its associated indicating means, and closing its associated normally open contacts in series with the flow fault relay to energize said flow fault relay and opening its associated, normally closed contacts in series with said deicing fluid-flow fault relay coil, whereby said deicing fluid-flow fault relay cannot be energized until said water-flow fault relay is de-energized.

3. Control circuitry as in claim 2 whereby when a deicing fluid fault occurs, the deicing fluid-flow fault relay coil is energized, thereby activating its associated indicating means, closing its associated, normally open contact in series with the flow fault relay to energize said flow fault relays and opening its associated, normally closed contacts in series with said water-flow fault relay coil whereby said water-flow fault relay cannot be energized until said deicing fluid-fault relay is de-energized.

4. Control circuitry as in claim 2, including manual control means for resetting said relays to an initial or normal condition.

* * * * *